(12) United States Patent
Gaid et al.

(10) Patent No.: US 10,301,193 B2
(45) Date of Patent: May 28, 2019

(54) METHOD FOR WATER TREATMENT BY ADSORPTION AND FILTRATION ON A GRANULAR MATERIAL BED

(71) Applicant: VEOLIA WATER SOLUTIONS & TECHNOLOGIES SUPPORT, Saint-Maurice (FR)

(72) Inventors: Abdelkader Gaid, Paris (FR); Philippe Sauvignet, Saint-Etienne en Cogles (FR)

(73) Assignee: Veolia Water Solutions & Technologies Support, Saint Maurice (FR)

( * ) Notice: Subject to any disclaimer, the term of this patent is extended or adjusted under 35 U.S.C. 154(b) by 0 days.

(21) Appl. No.: 15/319,250

(22) PCT Filed: Jun. 18, 2015

(86) PCT No.: PCT/EP2015/063669
§ 371 (c)(1),
(2) Date: Dec. 15, 2016

(87) PCT Pub. No.: WO2015/193410
PCT Pub. Date: Dec. 23, 2015

(65) Prior Publication Data
US 2017/0129785 A1    May 11, 2017

(30) Foreign Application Priority Data

Jun. 18, 2014 (FR) ...................................... 14 55618

(51) Int. Cl.
*B01J 49/00* (2017.01)
*C02F 1/28* (2006.01)
(Continued)

(52) U.S. Cl.
CPC .............. *C02F 1/283* (2013.01); *B01J 20/20* (2013.01); *B01J 20/28004* (2013.01);
(Continued)

(58) Field of Classification Search
USPC ......... 210/19, 25, 33–35, 67, 77, 80–82, 84, 210/104, 108, 131, 189, 268, 269, 274,
(Continued)

(56) References Cited

U.S. PATENT DOCUMENTS 3,855,123 A * 12/1974 Strudgeon .............. B01D 15/00
210/264
4,126,546 A * 11/1978 Hjelmner ................ B01D 24/16
210/741

(Continued)

FOREIGN PATENT DOCUMENTS

CA         1082976       8/1980
WO     WO 9521794 A1 *  8/1995    ................ C02F 9/00

*Primary Examiner* — Hayden Brewster
(74) *Attorney, Agent, or Firm* — Coats & Bennett PLLC

(57) ABSTRACT

Method for treating water by filtration on a bed of granular material in order to reduce its content in contaminants, said method comprising the steps for: making said water travel in transit in a reactor containing said bed in a upward flow at a speed that does not permit the fluidization of said bed but permits said material to migrate, as and when the filtration takes place, towards the lower part of said reactor, continuously removing a fouled granular material at the foot of the reactor, by means of a piping into which a gas is insufflated, said fouled granular material being constituted by granular material and contaminants adsorbed on said granular material; continuously or intermittently carrying out the physical cleansing of said fouled granular material thus removed, so as to obtain a cleansed granular material essentially rid of said contaminants; reinjecting the granular material thus cleansed into an upper part of said bed; characterized in that the granular material is an adsorbent granular material and (Continued)

Figure 1:
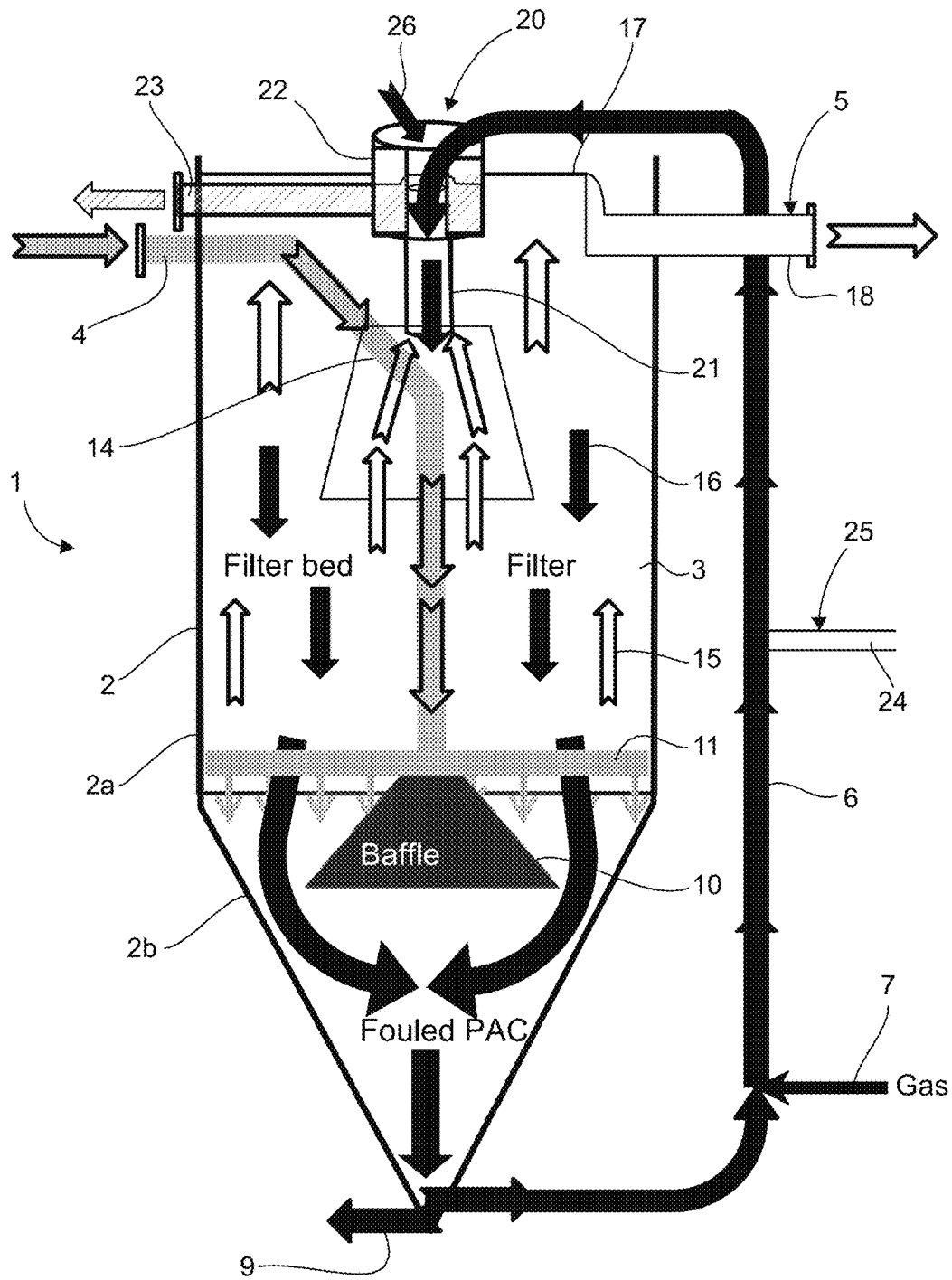

in that it comprises: a continuous or intermittent step for the discharging, during the filtration, of a part of the fouled granular material removed at the foot of the reactor; and a continuous or intermittent step for the introduction into the reactor, during the filtration, of fresh granular material in a quantity sufficient to compensate for the part of granular material discharged.

14 Claims, 4 Drawing Sheets

(51) Int. Cl.
*C02F 1/78* (2006.01)
*B01J 20/20* (2006.01)
*B01J 20/28* (2006.01)
*B01J 20/34* (2006.01)
*C02F 1/00* (2006.01)
*C02F 1/42* (2006.01)

(52) U.S. Cl.
CPC ..... *B01J 20/28016* (2013.01); *B01J 20/3416* (2013.01); *B01J 20/3458* (2013.01); *C02F 1/001* (2013.01); *C02F 1/78* (2013.01); *C02F 2209/003* (2013.01); *C02F 2209/40* (2013.01); *C02F 2209/44* (2013.01); *C02F 2303/16* (2013.01); *C02F 2303/18* (2013.01)

(58) Field of Classification Search
USPC ................ 210/275, 279, 285, 340, 670, 341
See application file for complete search history.

(56) References Cited

U.S. PATENT DOCUMENTS

| | | | | |
|---|---|---|---|---|
| 4,197,201 A | * | 4/1980 | Hjelmner | ............. B01D 24/002 |
| | | | | 210/189 |
| 5,508,243 A | * | 4/1996 | Mitzkat | ...................... B01J 8/16 |
| | | | | 219/388 |
| 2014/0060727 A1 | * | 3/2014 | Stouffer | ................... B01J 20/20 |
| | | | | 156/245 |

* cited by examiner

METHOD FOR WATER TREATMENT BY ADSORPTION AND FILTRATION ON A GRANULAR MATERIAL BED

This application is a U.S. National Stage Application of PCT Application No. PCT/EP2015/063669, with an international filing date of 18 Jun. 2015. Applicant claims priority based on French Patent Application No. 1455618 filed 18 Jun. 2014. The subject matter of these applications is incorporated herein.

1. FIELD OF THE INVENTION

The invention pertains to the field of the treatment of water.

More specifically, the invention pertains to a method for treating water in order to reduce its content in organic matter as well as its content in micropollutants. Such micropollutants can especially be constituted by pesticides, endocrine disruptors, residues of medicines or residues of industrial products.

The method according to the invention forms part of the context of methods for treating water implementing a granular material enabling the retention of the organic matter and micropollutants that it contains.

The method that is the object of the invention can be applied especially in the fields of water potabilization, the tertiary treatment of wastewater and the treatment of industrial wastewater with a view to its discharge it into the natural environment or its re-utilization.

2. PRIOR ART

There are various known prior-art methods of water treatment that use a granular material to retain the organic matter and, as the case may be, the micropollutants contained in water or in an effluent.

Thus, the most basic techniques implement filtration on a simple sand bed. When such a bed is clogged, the filtration must be stopped in order to wash it, generally by sending treated water in a counter flow (this is the backwashing process).

Other techniques using sand in more complex devices enable the sand to be cleansed while the filter is being used, without interrupting the filtration process.

Thus, there is a method known from the patent application FR2342769A for filtering water in which water to be treated is made to travel through a reactor containing a sand bed. The water is made to travel in an upward flow, at a speed that does not permit the fluidization of the bed but allows the sand to migrate, as and when the filtration takes place, towards the lower part of said reactor. The fouled granular material is continuously removed at the foot of the reactor, by means of a piping, provided in the reactor, into which a gas is insufflated. The fouled sand thus removed is continuously cleansed so as to obtain a cleansed sand. The sand thus cleansed is reinjected into an upper part of the bed.

The sand enables physical filtration but does not, however, allow for the retention of the non-agglomerated organic matter.

More advanced methods, at times combined with filtration on sand, implement filtration on one or more adsorbent granular materials. Among these adsorbent granular materials, activated carbon is a preferred material because of its very great specific surface area in proportion to its adsorption capacity.

Certain methods thus implement a step for filtering water on a granular activated carbon (GAC) bed. The granular activated carbon bed consists of particles having a mean size of 1 mm to 3 mm.

Such a material has properties of filtration and adsorption.

GAC also has the advantage of being capable of regeneration in the sense that physical and/or physical-chemical treatment can be applied to it so as to at least partially restore its capacities of adsorption. To this end, the method most commonly implemented consists of a thermal reactivation performed in an oven within which there prevails a high temperature (in the region of 800° C.) enabling the adsorbed molecules to be destroyed by the heat. Steam can be used to improve this regeneration process, the granular activated carbon being then retrieved in a structure very similar to the initial structure, free of all pollutants. The regeneration of the granular activated carbon can thus be performed by acid washing or base washing which however does not enable the GAC to retrieve all its initial performance.

The main drawback of the use of granular activated carbon in the context of water treatment methods is that this material is very soon saturated by the matter adsorbed therein.

This speedy saturation obliges the user to renew it frequently. The costs of exploitation are thereby increased.

In addition, the speedy saturation of GAC implies that the performance of water treatment that uses this GAC is not stable over time or lasting, making it difficult to use or even prohibiting its use for certain applications.

It has also been observed that when the granular activated carbon is saturated, a shedding of the adsorbed organic substances could occur. Such a shedding of substances can have negative results on the final quality of the treated water. To prevent this consequence, the renewal of the GAC must take place rapidly.

In practice, this renewal cannot be done without stopping the operation of the plants. This leads to all the drawbacks related to such an interruption and especially to a loss of productivity of the plants. In practice also, placing large quantities of fresh GAC, as and when needed and hence at irregular intervals, systematically leads to a period of over-performance of the system. As a consequence, the systems of disinfection and the requirements in oxidant (chlorine) are modified.

According to another type of prior-art method, there are known ways of using the activated carbon not in granular form but in powdered form. According to those skilled in the art of water treatment, powdered activated carbon (PAC) is constituted by particles having an average size of 5 μm to 50 μm, and preferably between 15 μm and 25 μm without taking account of fines. Its mean size is therefore far smaller therefore that of granular activated carbon. PAC indeed as compared with GAC has the advantage of possessing a far greater specific surface area.

These techniques implement reactors containing PAC in which the water to be treated is put into contact for a sufficiently lengthy period of time to enable the efficient absorption on the PAC of the matter to be eliminated that it contains. This putting into contact can be done on a fixed or fluidized bed or by injection of PAC into a reactor. In the latter case, the mixture of water and PAC, after the step of putting into contact, is subjected to a step of separation yielding on the one hand a powdered activated carbon charged with adsorbed matter and, on the other, clarified water. This step of separation can be done in different ways, mainly by settling or by membrane or mechanical filtration or even by fluidization (change of hydraulic speed).

A classic approach is that of adding coagulant or flocculent chemical products to the water and to the PAC, enabling the formation of flocs within the reactors in order to facilitate the step of separation.

The PAC charged with organic matter retrieved in the form of sludge at the exit from these decanters or membranes can be treated for example in a hydrocyclone so as to rid it of the organic material that it contains. The PAC thus treated can be recycled in the reactor.

However, while it can be recycled, the PAC also gradually loses its adsorbent capacity and a part of the PAC implemented within the reactor needs to be regularly replaced with fresh PAC. Quantities of fresh PAC must be regularly injected in parallel into the reactor to compensate for the loss of adsorption capacity of the used PAC.

Although this type of method allows for the replacement of a part of the used PAC with fresh PAC without any need to stop the plants that implement it, it also has other drawbacks.

Thus, the PAC coming from the purges of the system cannot be regenerated in that there is no known economically efficient treatment, enabling the PAC to be given back its original adsorbent capacity or a capacity close to this original adsorbent capacity. This results in the production of PAC sludges that must be discharged out of the plant and the treatment of which has drawbacks. The sludges must thus be dehydrated before being transported, and this increases the costs associated with their discharge or their incineration or their use in agricultural applications such as spraying.

Since PAC is a costly material, its use in the water treatment comes up against economic imperatives, as the techniques that implement it have the drawback of entailing high operating costs.

In addition, the treatment of water by PAC often implies the need to resort to the parallel use of chemical products, namely coagulant and/or flocculants, yielding substantial volumes of sludges that have to be treated in parallel systems. The costs are thereby increased.

Besides, it is not possible to use high speeds to make the water to be treated travel in transit in reactors containing it so as to limit PAC losses. The reactors must have substantial volumes thus also increasing the costs of such treatment.

It will also be noted that when the step of separation is performed by means of ultrafiltration membranes, major water losses are observed. Indeed, the frequency of the backwashing of the membranes has to be doubled or tripled in order to limit the formation of PAC cake on their surfaces, giving rise to loss of filtration capacity. This results in volumes of fouled water and therefore in significantly increased losses of water.

3. GOALS OF THE INVENTION

The goal of the present invention is to propose a method for treating water in order to rid it of the organic matter and micropollutants implementing an adsorbent granular material that can be renewed without having to interrupt the treatment.

It is a goal of the present invention to disclose a method of this kind that makes it possible to maintain a level of treatment of the water that is essentially constant in time.

It is another goal of the present invention to describe a method of this kind that induces costs of treatment that are lower than those of the prior-art methods, for appreciably equal levels of treatment.

Thus, it is a goal of the invention to disclose a method of this kind that does not require the combined use of chemical products such as coagulants or flocculants.

As a corollary, it is also a goal of the present invention to propose a method of this kind that does not lead to the formation of sludges that have to be put through specific steps of treatment such as thickening and dehydration.

It is yet another goal of the present invention to describe a method of this kind which, in certain embodiments, can be implemented in plants having a limited volume as compared with those used according to the prior-art methods, for substantially equal levels of treatment.

It is yet another goal of the present invention to disclose a method of this kind which, in at least certain embodiments, can be implemented with a granular material that can be easily regenerated.

4. SUMMARY OF THE INVENTION

These goals as well as others that shall appear here below are achieved according to the invention by means of a method for treating water by filtration on a bed of granular material in order to reduce its content in contaminants, said step comprising the steps for:

making water travel in transit in a reactor containing said bed in a upward flow at a speed that does not permit the fluidization of said bed but permits said material to migrate, as and when the filtration takes place, towards the lower part of said reactor;

continuously removing a fouled granular material at the foot of the reactor, by means of a piping into which a gas is insufflated, said fouled granular material being constituted by granular material, contaminants adsorbed on this granular material and particles retained by said granular material;

continuously or intermittently carrying out the physical cleansing of said fouled granular material thus removed, so as to obtain a cleansed granular material essentially rid of said contaminants and said particles;

reinjecting the granular material thus cleansed into said bed.

The method according to the invention is characterized in that said granular material is an adsorbent granular material and in that it comprises:

a continuous or intermittent step for the discharging, during the filtration, of said fouled granular material removed at the foot of the reactor; and a continuous or intermittent step for the introduction into said reactor, during the filtration, of fresh granular material in a quantity sufficient to compensate for said part of granular material discharged.

Thus, the invention proposes to discharge adsorbent granular material from the reactor this adsorbent granular material having, by its nature, adsorption capacities that get reduced in time even while the filtration is taking place, and to replace the material thus discharged by fresh adsorbent granular material, again while the filtering is taking place.

This characteristic of the method enables the adsorbent material to be renewed without having to stop the filtration, i.e. without having to stop the reactor in which the method is implemented.

The implementing of the method according to the invention does not imply stopping of the operation of the reactor, and its productivity is increased as compared with the methods of the prior art.

According to the method of the invention, the adsorbent granular material is therefore not only constantly cleansed but also constantly renewed in part. It is thus possible to maintain a level of treatment that is appreciably constant in time without having to interrupt the operation of the reactor in which said method is implemented.

In practice, this renewal can be done by intermittently discharging quantities of fouled granular material or again by continuously diverting a part of the flow of discharged fouled granular material through the foot of the reactor.

As compared with the methods of the prior art implementing a step for putting the water to be treated into contact with an adsorbent granular material followed by a step of membrane separation or by decantation (or settling), the method of the invention has the threefold advantage wherein it can be implemented in small-sized plants, does not lead to the formation of sludges entailing specific treatment, and requires no input of coagulation or flocculent type chemical products. It is thus more economical than the methods of the prior art.

It is possible to envisage the implementing of said continuous or intermittent step for the discharging, during the filtration, of a part of said fouled granular material by carrying out such a removal directly from the lower part of the reactor, for example by purging means provided for this purpose.

However, preferably, this step is performed by drawing out said part from the piping into which a gas is insufflated by an air-lift process, used to remove the fouled granular material at the foot of the reactor for the purposes of cleansing it. In this context, the reactor used to implement the method is provided with a piping of this kind mounted externally on the very body of said reactor.

Implementing the removal of fouled granular material from such a piping external to the reactor facilitates the implementing of this step. Indeed, such a piping can be provided with draining means enabling quantities of fouled granular material to be discharged from it from time to time.

According to another embodiment, this piping can be provided with means enabling the continuous discharge of a part of the flow of material travelling through it. Whatever the mode of discharge used, it enables the extraction from the reactor of a part of the granular material being used so as to gradually renew it in the reactor by adding, into the reactor, a part of fresh granular material compensating for the quantities of fouled granular material discharged and thus maintaining the treatment performance of the method over time.

It is possible to envisage the use of different types of adsorbent granular materials in the method according to the invention. Thus, it is possible to envisage the use especially of activated carbon, expanded clay or again resins. However, the material used will preferably be microgranular activated carbon.

In a preferred way among others, the activated carbon will be used, however, neither in its "powdered activated carbon" (PAC) form nor in its "granular activated carbon" (GAC) form according to the definitions of these terms by those skilled in the art as specified here above, but in the form of agglomerates of activated carbon particles, said agglomerates having an average size of 200 μm to 1000 μm, preferably 400 μm to 600 μm an iodine value of over 1000 mg/g.

Such agglomerates, which are commercially available, have a smaller grain size than that of GAC and greater grain size than that of PAC. In addition, they have specific surface areas representing their adsorbent capacities which are of the same order as those of PAC. They also have the advantages of being self-draining so that, after draining, they can be retrieved in a practically dry form and of being easily regenerated by thermal means. They enable excellent adsorption of the organic material and of the micropollutants and thus have filtering capacity.

Advantageously, the method according to the invention comprises an additional step of draining said granular material constituted by agglomerates of discharged fouled activated carbon particles. Such a draining step is a simple step by which such a material can be put into a state where it subsequently directly undergoes a step of thermal regeneration. According to such a variant, it is not necessary to make the fouled granular material undergo a step of treatment aimed at separating it from the retained organic material, a step that would lead to the production of sludges. The method according to the invention, as already indicated here above, indeed makes possible it to do away with the need for such a production which entails high treatment costs and specific plants. On the contrary, after simple draining, the granular material can be simply stored in barrels so as to be conveyed towards a thermal regeneration unit capable of being taken charge of by the supplier of this material in the absence of other treatment. The water treatment plants implementing the method of the invention therefore require no specific line for the treatment of fouled granular material whether with a view to its cleansing or with a view to its regeneration, thus making it possible as compared with the prior-art techniques to reduce both exploitation costs and maintenance costs.

According to one variant, the gas insufflated into the piping used to remove the fouled granular material from the foot of the reactor comprises ozone or is constituted by ozone, the method then comprising an additional step of oxidation of the contaminants adsorbed on the granular material removed by means of this gas, such as for example soluble manganese or soluble iron. Such a gas constituted by ozone or including ozone therefore meets the physical function required to carry out an airlift operation but in addition responds to a chemical function of oxidation of the organic material enabling its degradation. The performance of the method of filtration and adsorption according to the invention is thereby further improved.

Preferably, said step for making water travel through said reactor is carried out so that the time of contact of said water with said granular material ranges from 5 min to 20 min, and preferably from 8 min to 12 min. Such times are compatible with obtaining quality treatment levels while limiting the volume of the reactor.

Advantageously, said step for making the water to be treated travel in transit in said reactor is carried out at a speed ranging from 5 m/h to the fluidization speed, typically 50 m/h, and preferably from 10 to 20 m/h. Such speeds are chosen to enable a time of contact between the granular material and the effluent within the bed that is sufficient to enable the adsorption of the organic material and of the micropollutants and a filtration leading to a reduction of pollution and turbidity.

The input of fresh material can be done manually. However, in one variant, the method comprises a step for measuring the quality of the water treated and a step for the automatic dispensing of fresh granular material into the reactor according to the results of said measurements.

Advantageously, said continuous or intermittent step for the discharging, during the filtration, of a part of said fouled granular material removed at the foot of the reactor and said continuous or intermittent step for the introduction into said reactor, during the filtration, of the fresh granular material are performed so as to follow a rate of renewal of said granular material ranging from 2 g/m³ to 50 g/m³ of water to be treated, preferably from 10 g/m³ to 20 g/m³ of water to be treated.

Such a rate of renewal will make it possible to maintain the performance of the method in the majority of cases.

The method according to the invention could be implemented in a plant including a reactor, the body of which has a cylindrical part and a substantially conical foot, said body receiving a bed of adsorbent granular material within it, the reactor being provided with means for introducing raw or untreated water, means of extraction, preferably by overflow, of raw water, and the means of extraction preferably by overflow of filtered water provided in its upper part and means for removing fouled granular material provided in its lower part including a piping into which a gas is insufflated, designed to bring the fouled granular material into the upper part of the reactor, means for cleansing this fouled granular material thus removed so as to obtain a part of cleansed granular material and fouled water, means for re-injecting the granular materials thus cleansed into said bed and means for discharging fouled water, the plant comprising means of continuous or intermittent discharging of a part of the fouled granular material removed at the foot of the reactor.

The addition of a fresh granular material could for its part be done manually or else automatically according to measurements made on the treated water coming out of the reactor. In the latter case, the plant for implementing the method according to the invention preferably comprises means for measuring the quality of the treated water and means for the automatic dispensing into the reactor of fresh granular material according to the results of said measurements.

Preferably, the piping into which a gas is insufflated is external to the body of the reactor, i.e. it is not placed inside this body and therefore does not cross the bed of granular material. It preferably connects the foot of the reactor to its upper part. It is provided with means for conveying gas enabling the transportation of the fouled granular material to the head of the reactor. Thus, the discharging of a part of the fouled granular material can be done from this piping, thus facilitating the implementation of the method and the maintenance of the plant.

Also preferably, the granular material constituting the bed is constituted by agglomerates of particles of activated carbon, said agglomerates having an average size of 200 μm to 1000 μm, preferably 400 μm to 600 μm, and an iodine value above 1000 mg/g.

Also preferably, the means for cleansing the body of the reactor include a helical ramp provided in the upper part of the body of the reactor, the upper part of this ramp being connected to one end of the piping into which the gas is insufflated and which provides it with fouled granular material to be cleansed, and the lower part of this ramp communicating with the content of the reactor receiving filtered water which undergoes an upward motion in this reactor. Through such means, the fouled granular material descends by gravity along the ramp, in meeting filtered water which follows a reverse path. This crossing prompts the gradual cleansing of the granular material which, when it exits from the ramp, is redistributed in a cleansed form in the bed.

Advantageously, the device for implementing the method according to the invention comprises a baffle provided within the body of the reactor to favor the migration of the granular material towards the foot of the reactor.

Also advantageously, the method is implemented in a plant provided with means of equidistribution making it possible to bring uniformity to the distribution of raw water in the reactor. These means preferably include a plurality of ramps arranged radially. The distal ends of these ramps can advantageously be connected to one another by an element reinforcing their structure, for example a hoop.

Finally, in one valuable variant, the means for conveying a gas into the piping are means for conveying ozone or a mixture of air and ozone.

5. LIST OF FIGURES

Figure 2:
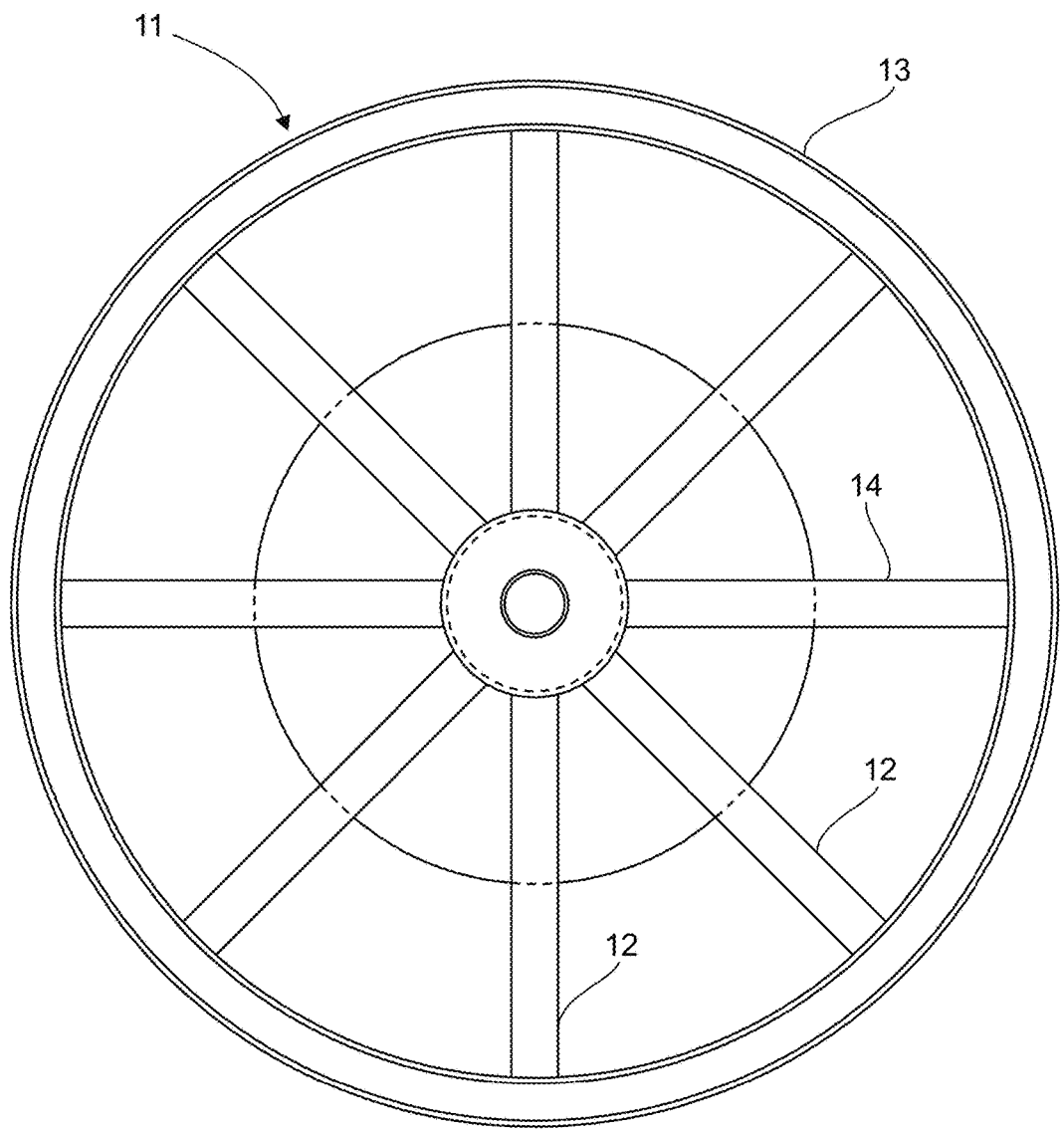
Figure 3:
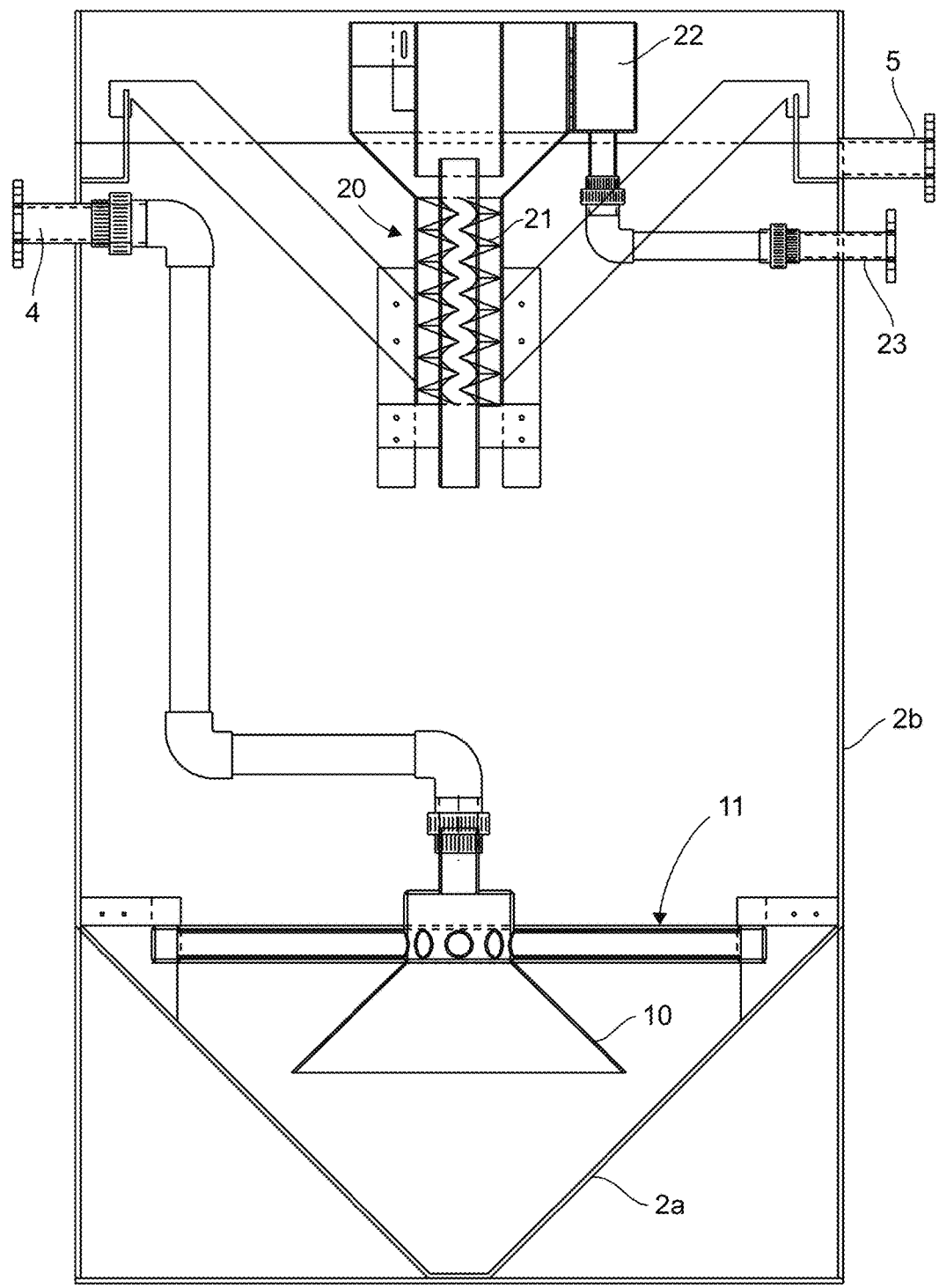
Figure 4:
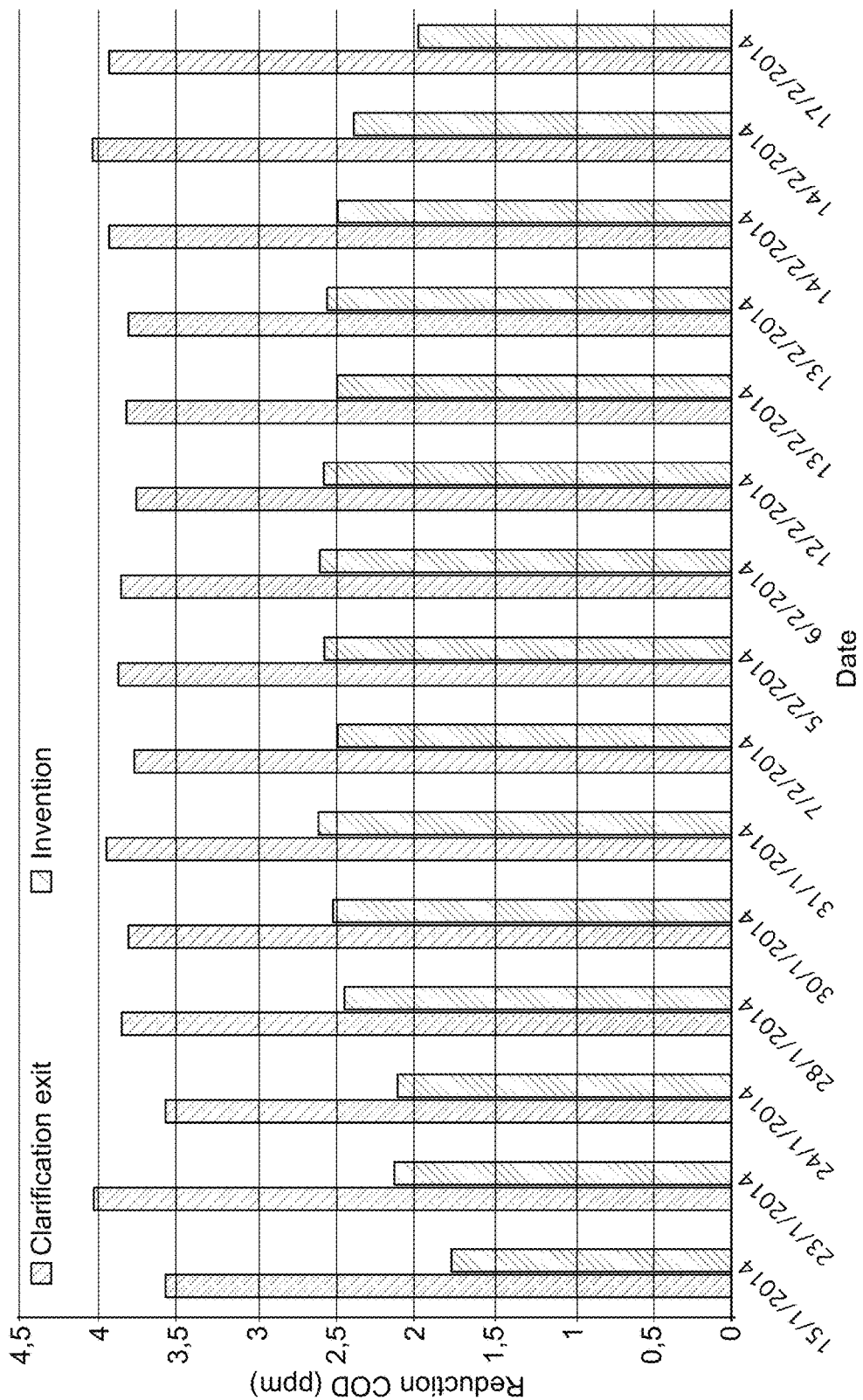

The invention as well as its different advantages will be understood more clearly from the following description of a non-exhaustive embodiment of the invention given with reference to the appended drawings, of which:

FIG. 1 is a schematic view of a plant for implementing the method according to the invention;

FIG. 2 also presents a schematic view of the means for dispensing raw water in the body of the reactor represented in FIG. 1;

FIG. 3 also schematically represents a view in section of the reactor of the plant represented in FIG. 1, presenting a detailed view especially of the means for cleansing the fouled granular material removed from the foot of the reactor;

FIG. 4 is a graph representing the reduction of the organic material ("chemical organic demand" or COD) over time by means of the invention.

6. DETAILED DESCRIPTION OF ONE EMBODIMENT OF THE INVENTION

Referring to FIGS. 1 and 3, the method of the invention is implemented in a plant which includes a reactor 1 comprising a reactor body 2 within which there is disposed a filtering bed of adsorbent granular material 3.

This reactor body 2 has a cylindrical upper part 2a and a conical lower part 2b forming a reactor bed.

This reactor 1 is provided in its upper part with 4 means for introducing water to be treated and means 5 for extracting treated water.

This reactor also comprises a piping 6 mounted externally to the body 2 of the reactor 1. One of the ends of this piping 6 is connected to an aperture provided in the conical lower part 2b of the reactor body 2. The other end of this piping 6 joins the reactor body 2 in its cylindrical upper part 2a. This piping 6 cooperates with means 7 for conveying gas, in this case air, supplied through a compressor (not shown).

Draining means 9 for draining the content of the reactor are also provided in the lower part of the reactor.

Means 4 for introducing raw water into the reactor are extended by a piping 14 leading raw water to a device 11 for equidistribution of water within the filter bed 3.

Inside the reactor, a baffle 10 is also provided. This baffle 10 takes the form of a cone anchored to the center of the reactor.

Finally, the reactor also comprises means 20 for cleansing the granular material provided in the upper part of the reactor 1. The end of the piping 16 arrives at the level of these means 20. These cleansing means include a helical ramp 21, the lower end of which leads into the interior of the reactor while its upper end cooperates with a box 22 connected to a piping for discharging fouled water 23.

Referring to FIG. 2, the equidistribution device 11 for raw water to be treated within the filter bed takes the form of a plurality of radial ramps 12 pierced with holes and connected to each other by a circular piping 13 also pierced with holes.

The slope of the helical ramp is designed to allow the descent by gravity of this granular material along the ramp in a counterflow to filtered water rising in this ramp. The filtered water then constitutes washing water that gradually gets charged with organic matter and thus cleanses the granular material. The fouled water is retrieved in the box 22 provided in the upper part of the cleansing means 20 and discharged by a piping 23.

A baffle 10 constituted by a metal cone is provided in the lower part of the reactor. This baffle 10 prevents the treated water from taking preferred paths of travel within the filter bed 3.

In compliance with the implementation of the method according to the invention, the filter bed is constituted by agglomerates of activated carbon particles.

The agglomerates in question have an average diameter of 396 μm. The coefficient of uniformity of this material is 1.4 Its apparent density is 510 g/l.

Referring to FIG. 1, the working of the plant represented for implementing the method was the following.

During trials, the filtering speed was 3.7 m/h for a residence time of the water in the granular material of 9 min, corresponding to an overall residence time of the water in the reactor of 15 min, the flow rate of the airlift for its part being fixed at 0.1 $m^3/h$.

The water to be treated arrives by the piping 4 and is conveyed by the piping 14 up to the equidistribution means 11. For experimental needs, this supply is done at a flow rate of 1 $m^3/h$. However, far higher feed flow rates, of the order of 10 $m^3/h$ to 15 $m^3/h$, or even more, can be used at the industrial stage.

The water travels in the filter bed 3 of adsorbent granular material. This travel enables both its filtration and the adsorption on the granular material in question of the organic matter and of the micropollutants that it contains. This travel is done in an upward flow as shown by the unshaded or blank arrows 15. The water thus filtered is discharged by the means 5 for extracting treated water which include an overflow element 17 and a discharge piping 18.

Within the reactor, as and when it gets charged with organic matter, the adsorbent granular material migrates towards the upper part of the reactor demarcated by the conical part 2b of its body 2. This migration is symbolized by the solid arrows 16. This fouled granular material is finally captured by the airlift, prompted by the input of air through the means 7 in the piping 6, and sent back into the upper part of the body 2 of the reactor in the cleansing means 20.

Referring to FIG. 1, on the piping 16 there are provided discharging means 25 including a piping 24. These discharging means 25 enable the discharge, during the filtration, i.e. during the working of the reactor, of a part of the fouled granular material that has been picked up at the foot of the reactor and is being conveyed towards the cleansing means 20. In practice, during trials performed, the flow rate of matter discharged was fixed at 0.08 m/h, or 8% of the treatment flow rate.

To compensate for the discharge of this fouled granular material, which can be done continuously or intermittently, fresh granular material is introduced into the device as symbolized by the arrow 26.

By means of the airlift, the fouled granular material reaches the cleansing means 20 through the piping 6. During its path in the helical ramp 21, it meets filtered water rising by this very same ramp, thus enabling it to be cleansed. The advantage of the use of such a helical ramp is that of increasing the contact between the fouled material and the washing water constituted by filtered water. Indeed, in the prior art, there are cleansing means for this type of reactor according to which only one part of the fouled granular material meets the wash water, leading to imperfect cleansing of this water.

Water constituted by water to be potabilized, coming from a dam and having undergone a clarification step, was treated by the method according to the invention from Jan. 15 to Feb. 17, 2014. Before clarification, the water depending on the period had a relatively stable temperature varying from 11° C. to 13° C. and an organic matter content (COD) of 4 mg/l to 5.5 mg/l.

At exit from the clarification process, the raw water had a COD content of 3 mg/l to 4 mg/l depending on the period.

This clarified water was conveyed towards the device represented and described with reference to FIGS. 1 to 3.

Referring to FIG. 4, the method of the invention enables this COD value to be made to pass from 3 mg/l-4 mg/l to 1.7-2.5 mg/l approximately.

The invention claimed is:

1. A method of removing particles and organic matter from water by employing a bed of adsorbent granular material disposed in a reactor, the method comprising:
directing the water into the reactor and upwardly from a bottom portion of the reactor through the bed of adsorbent granular material and to a top portion of the reactor;
as the water flows upwardly through the bed of adsorbent granular material, continuously flowing the adsorbent granular material downwardly to the bottom portion of the reactor;
as the water moves upwardly through the bed of the adsorbent granular material, filtering the water with the adsorbent granular material to remove particles from the water, resulting in the bed of adsorbent granular material retaining the particles;
in addition, as the water moves upwardly through the bed of adsorbent granular material, adsorbing the organic matter in the water onto the adsorbent granular material;
wherein filtering the water with the adsorbent granular material and absorbing the organic matter from the water onto the adsorbent granular material yields a treated water;
conveying the adsorbent granular material and the retained particles from the bottom portion of the reactor to a cleaning station disposed over the bed of adsorbent granular material;
wherein a portion of the treated water is used as a cleaning water to clean the adsorbent granular material by contacting the adsorbent granular material with the cleaning water and separating the particles from the adsorbent granular material;
discharging the cleaning water and the particles separated from the adsorbent granular material from the reactor;
continuously or intermittently purging a portion of the adsorbent granular material having organic matter absorbed therefrom from the reactor and injecting fresh adsorbent granular material into the reactor;
discharging the treated water from the reactor; and
wherein the cleaning station includes a helical ramp having an upper portion and a lower portion and the method includes discharging the adsorbent granular material and retained particles into the upper portion of the helical ramp and directing treated water into the lower portion of the helical ramp such that the adsorbent granular material and retained particles move counter to the treated water and wherein the treated water is effective to separate the retained particles from the adsorbent granular material.

2. The method of claim 1 wherein the adsorbent granular material comprises agglomerates of adsorbent granular material.

3. The method of claim 1 wherein the adsorbent granular material comprises agglomerates of adsorbent granular material having an average size of 200 micron to 1000 micron.

4. The method of claim 1 wherein the adsorbent granular material comprises agglomerates of activated carbon particles with said agglomerates having an average size of 200 micron to 1000 micron and wherein the agglomerates of the activated carbon particles have a smaller size than that of granular activated carbon and a greater grain size than powdered activated carbon.

5. The method of claim 1 including conveying the adsorbent granular material through a conduit to the cleaning station and injecting a gas into the conduit and employing the gas to lift the adsorbent granular material and filtered particles upwardly through the conduit towards the cleaning station.

6. The method of claim 5 wherein the conduit includes a portion that is disposed exteriorly of the reactor.

7. The method of claim 1 including thermally regenerating at least a portion of the purged adsorbent granular material.

8. The method of claim 1 including the step of mixing ozone with the adsorbent granular material prior to the adsorbent granular material reaching the cleaning station.

9. The method of claim 1 wherein the adsorbent granular material and retained particles are directed from the bottom portion of the reactor into a conduit that directs the adsorbent granular material upwardly towards the cleaning station; the method including injecting a gas into the conduit and air lifting the adsorbent granular material and retained particles upwardly through the conduit towards the cleaning station; and wherein purging the adsorbent granular material includes removing a portion of the adsorbent granular material from the conduit at a point in the conduit between a point where the gas is injected and the cleaning station.

10. The method of claim 1 including directing the water upwardly through the bed of adsorbent granular material at a speed that does not permit the fluidization of said bed but which allows the adsorbent granular material to flow downwardly in the reactor as filtration occurs.

11. The method of claim 1 including conveying the adsorbent granular material through a conduit to the cleaning station and injecting a gas into the conduit and employing the gas to lift the adsorbent granular material and filtered particles upwardly through the conduit towards the cleaning station;
purging at least a portion of the adsorbent granular material by removing a portion of the adsorbent granular material from the conduit at a point in the conduit between a point where the gas is injected and the cleaning station; and
directing the water upwardly through the bed of adsorbent granular material at a speed that does not permit the fluidization of said bed but which allows the adsorbent granular material to flow downwardly in the reactor as filtration occurs.

12. The method of claim 1 including conveying the adsorbent granular material having adsorbed organic matter through a conduit to the cleaning station; oxidizing and degrading the organic matter adsorbed on the adsorbent granular material as the adsorbent granular material moves through the conduit; wherein oxidizing and degrading the organic matter adsorbed on the adsorbent granular material includes injecting a gas containing ozone into the conduit; and wherein the gas containing ozone carries out both an air lift operation and at the same time functions to oxidize and degrade the organic matter adsorbed onto the adsorbent granular material.

13. The method of claim 1 further including:
renewing the adsorbent granular material without interrupting the treatment of the water moving through the reactor such that filtration of the water and removing organic matter from the water continues while renewing the adsorbent granular material;
directing the water upwardly through the bed of adsorbent granular material at a speed that does not permit the fluidization of said bed but which allows the adsorbent granular material to flow downwardly in the reactor as filtration occurs; and
constantly cleaning the adsorbent granular material and constantly renewing the adsorbent granular material.

14. The method of claim 13 wherein the adsorbent granular material comprises activating carbon that is not a powdered activated carbon nor a granular activated carbon, and wherein the activated carbon assumes the form of agglomerates of activated carbon having an average size of 400 μm to 600 μm.

\* \* \* \* \*